(12) United States Patent
Zha

(10) Patent No.: US 10,241,255 B2
(45) Date of Patent: Mar. 26, 2019

(54) BACKLIGHT MODULE AND LIQUID CRYSTAL DISPLAY

(71) Applicant: Wuhan China Star Optoelectronics Technology Co., Ltd., Wuhan, Hubei (CN)

(72) Inventor: Guowei Zha, Guangdong (CN)

(73) Assignee: Wuhan China Star Optoelectronics Technology Co., Ltd, Wuhan, Hubei (CN)

(*) Notice: Subject to any disclaimer, the term of this patent is extended or adjusted under 35 U.S.C. 154(b) by 239 days.

(21) Appl. No.: 15/117,443

(22) PCT Filed: Jul. 20, 2016

(86) PCT No.: PCT/CN2016/090603
§ 371 (c)(1),
(2) Date: Aug. 8, 2016

(87) PCT Pub. No.: WO2017/206290
PCT Pub. Date: Dec. 7, 2017

(65) Prior Publication Data
US 2018/0196186 A1 Jul. 12, 2018

(30) Foreign Application Priority Data

Jun. 3, 2016 (CN) .................. 2016 1 03900788

(51) Int. Cl.
*G02B 6/00* (2006.01)
*F21V 8/00* (2006.01)
*G02F 1/133* (2006.01)

(52) U.S. Cl.
CPC .............. *G02B 6/0048* (2013.01); *G02B 6/00* (2013.01); *G02B 6/0068* (2013.01); *G02F 1/133* (2013.01)

(58) Field of Classification Search
CPC .. G02B 6/0016; G02B 6/0018; G02B 6/0028; G02B 6/0068; G02F 1/133602; G02F 1/133603; G02F 1/133604
See application file for complete search history.

(56) References Cited

U.S. PATENT DOCUMENTS 5,982,090 A 11/1999 Kalmansh
9,268,166 B2 2/2016 Dunn et al.
(Continued)

FOREIGN PATENT DOCUMENTS

CN 201680228 A 12/2010
CN 102231027 A 11/2011
(Continued)

*Primary Examiner* — Angela K Davison
(74) *Attorney, Agent, or Firm* — Andrew C. Cheng

(57) ABSTRACT

The present disclosure discloses a backlight module and a liquid crystal display, the backlight module comprises: a light guide plate, a first light source and a second light source; wherein said light guide plate comprises a light emitting surface and a bottom surface as well as a side surface; said light emitting surface and said bottom surface define thickness of said light guide plate, said light guide plate at least comprises a first portion which is relatively thicker and a second portion which is relatively thin; said first light source is provided opposite the side of said light guide plate, said second light source is provided opposite said bottom surface or said light emitting surface of said light guide plate second portion. Through the above way, the present disclosure can achieve the split-screen display of the display device, simultaneously reducing the power consumption of the display device.

17 Claims, 3 Drawing Sheets

(56) References Cited

U.S. PATENT DOCUMENTS

| | | | |
|---|---|---|---|
| 2012/0262645 A1* | 10/2012 | Li | G02B 6/0078 |
| | | | 349/64 |
| 2012/0287673 A1 | 11/2012 | Tang et al. | |
| 2013/0094242 A1 | 4/2013 | Yang | |
| 2013/0307831 A1 | 11/2013 | Robinson et al. | |
| 2013/0335821 A1* | 12/2013 | Robinson | G02B 6/0023 |
| | | | 359/464 |
| 2014/0146271 A1 | 5/2014 | Hung | |
| 2015/0346417 A1* | 12/2015 | Powell | G02B 6/0051 |
| | | | 362/607 |
| 2017/0160598 A1 | 6/2017 | Tang et al. | |

FOREIGN PATENT DOCUMENTS

| | | |
|---|---|---|
| CN | 203744019 U | 7/2014 |
| CN | 105093764 A | 11/2015 |
| CN | 105182651 A | 12/2015 |
| JP | 2007171740 A | 7/2007 |
| KR | 20120069458 A | 6/2012 |

* cited by examiner

BACKLIGHT MODULE AND LIQUID CRYSTAL DISPLAY

BACKGROUND OF THE DISCLOSURE

1. Field of the Disclosure

The present disclosure relates to display technical field, and in particular to a backlight module and a liquid crystal display.

2. The Related Arts

For traditional liquid crystal display, LCD, because the panel of LCD is not light itself, it needs to use external sources to be displayed, the light source generally comprises backlight source and reflective light source, since the backlight source will not be changed by environment, the light source of the current LCD display is almost backlight source.

In LCD backlight source, the type of light source experienced from cold cathode fluorescent lamp, CCFL, to light emitting diode, LED. Because LED has advantages of small size, fast response time, long life, non-friable, high color gamut, many kinds of package and so on, it has become the mainstream of the backlight. LED backlighting can be basically divided into side-type backlight source and a direct type backlight source.

Along with the gradual improvement of the liquid crystal display function, there is often the situation such as split-screen display, partial display and so on, however, existing side-type backlight source is difficult to achieve the above functions at the premise of low power consumption, although the direct type backlight source is able to perform these functions, it has disadvantage such as a larger power consumption, heavy weight, high cost and so on.

SUMMARY OF THE DISCLOSURE

The technical issue to be solved by the present disclosure is to provide a backlight module and a liquid crystal display, which can achieve the split-screen display, and simultaneously reducing the power consumption of the display device.

In order to solve the above technical issue, a technical solution adopted by the present disclosure is: to provide a backlight module, comprising: a light guide plate, a first light source and a second light source; wherein said light guide plate comprises a light emitting surface and a bottom surface which are oppositely disposed as well as a side surface which is connected with said light emitting surface and said bottom surface; said light emitting surface and said bottom surface defining thickness of said light guide plate, said light guide plate at least comprising a first portion which is relatively thicker and a second portion which is relatively thin; said first portion of said light guide plate being a wedge plate, said second portion of said light guide plate being a flat plate with uniform thickness, one end of said light guide plate second portion being connected with thin end of said light guide plate first portion, said second light source being provided near said bottom surface of said light guide plate second portion, said first light source being provided near the other end of said light guide plate second portion; wherein lighting pattern of said first light source and said second light source at least comprise: said first light source and said second light source being lit at the same time, said first light source being off and said second light source being lit.

Wherein said bottom surface of said light guide plate first portion is ladder, outlets, hit point or V-cut structure.

Wherein the total thickness of said second light source and said light guide plate second portion is less than the thickness of said light guide plate first portion, said first light source and said second light source are point light source, surface light source or line light source.

In order to solve the above technical issue, another technical solution adopted by the present disclosure is: to provide a backlight module, comprising: a light guide plate, a first light source and a second light source; wherein said light guide plate comprises a light emitting surface and a bottom surface which are oppositely disposed as well as a side surface which is connected with said light emitting surface and said bottom surface; said light emitting surface and said bottom surface defining thickness of said light guide plate, said light guide plate at least comprising a first portion which is relatively thicker and a second portion which is relatively thin; said first light source being provided opposite the side of said light guide plate, said second light source being provided opposite said bottom surface or said light emitting surface of said light guide plate second portion.

Wherein lighting pattern of said first light source and said second light source at least comprise: said first light source and said second light source being lit at the same time, said first light source being off and said second light source being lit.

Wherein said first portion of said light guide plate being a wedge plate, said second portion of said light guide plate being a flat plate with uniform thickness, one end of said light guide plate second portion being connected with thin end of said light guide plate first portion, said second light source being provided near said bottom surface of said light guide plate second portion, said first light source being provided near the other end of said light guide plate second portion.

Wherein said bottom surface of said light guide plate first portion is ladder, outlets, hit point or V-cut structure.

Wherein the total thickness of said second light source and said light guide plate second portion is less than the thickness of said light guide plate first portion, said first light source and said second light source are point light source, surface light source or line light source.

In order to solve the above technical issue, the other technical solution adopted by the present disclosure is: to provide a liquid crystal display, comprising: a display panel which is provided in stacks and a backlight module, said backlight module comprising: a light guide plate, a first light source and a second light source; wherein said light guide plate comprises a light emitting surface and a bottom surface which are oppositely disposed as well as a side surface which is connected with said light emitting surface and said bottom surface; said light emitting surface and said bottom surface defining thickness of said light guide plate, said light guide plate at least comprising a first portion which is relatively thicker and a second portion which is relatively thin; said first light source being provided opposite the side of said light guide plate, said second light source being provided opposite said bottom surface or said light emitting surface of said light guide plate second portion.

Wherein lighting pattern of said first light source and said second light source at least comprise: said first light source and said second light source being lit at the same time, said first light source being off and said second light source being lit, when said second light source being lit, said display panel being only displayed on the region corresponded to said light guide plate second portion.

Wherein said first portion of said light guide plate being a wedge plate, said second portion of said light guide plate being a flat plate with uniform thickness, one end of said light guide plate second portion being connected with thin end of said light guide plate first portion, said second light source being provided near said bottom surface of said light guide plate second portion, said first light source being provided near the other end of said light guide plate second portion.

Wherein said bottom surface of said light guide plate first portion is ladder, outlets, hit point or V-cut structure.

Wherein the total thickness of said second light source and said light guide plate second portion is less than the thickness of said light guide plate first portion, said first light source and said second light source are point light source, surface light source or line light source.

The benefit effect of the present disclosure is: to distinguish the situation of prior art, the backlight module of the present disclosure comprises: a light guide plate, a first light source and a second light source; wherein said light guide plate comprises a light emitting surface and a bottom surface which are oppositely disposed as well as a side surface which is connected with said light emitting surface and said bottom surface; said light emitting surface and said bottom surface define thickness of said light guide plate, said light guide plate at least comprises a first portion which is relatively thicker and a second portion which is relatively thin; said first light source is provided opposite the side of said light guide plate, said second light source is provided opposite said bottom surface or said light emitting surface of said light guide plate second portion. Through the above way, the present disclosure combines the direct type and side-type backlight, making the display device achieved the split-screen display, at the same time, since there is not all direct type backlight which consumes higher power, it is able to reducing the power consumption of the display device.

DETAILED DESCRIPTION OF THE PREFERRED EMBODIMENTS

Figure 1:
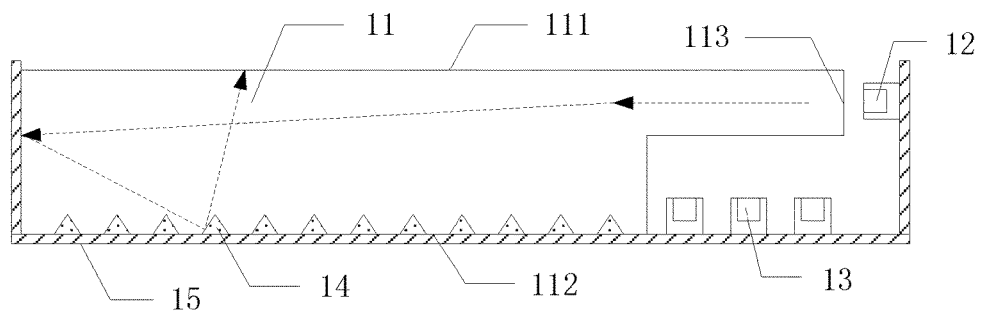
FIG. 1 is a structure side view diagram of a first embodiment of a backlight module of the present disclosure.

Refer to FIG. 1, FIG. 1 is a structure side view diagram of a first embodiment of a backlight module of the present disclosure, the backlight module comprises: a light guide plate 11, a first light source 12 and a second light source 13.

Wherein the light guide plate 11 comprises a light emitting surface 111 and a bottom surface 112 which are oppositely disposed as well as a side surface 113 which is connected with the light emitting surface 111 and the bottom surface 112; the light emitting surface 111 and the bottom surface 112 define thickness of the light guide plate 11, the light guide plate 11 at least comprises a first portion which is relatively thicker and a second portion which is relatively thin; the first light source 12 is provided opposite the side of the light guide plate 11, the second light source 13 is provided opposite the bottom surface 112 or the light emitting surface 111 of the light guide plate second portion.

Wherein the first light source 12 as shown in FIG. 1 is provided on the thin side surface 113 of the light guide plate 11, preferably, in the other embodiments, the first light source 12 also can be provided on the thicker side surface of the light guide plate 11.

Wherein the second light source 13 as shown in FIG. 1 is provided on the inside surface of the plastic frame 15 corresponding to the thin bottom surface of the light guide plate 11, preferably, in the other embodiments, the second light source 13 also can be provided on the light emitting surface or the bottom surface of the thin second portion of the light guide plate 11.

Specifically, the light guide plate 11 is produced by the optical class acrylic/PC sheet materials. Preferably, in one embodiment, the material having high reflection and not absorbing light can be used, printing a light guide point 14 on bottom surface of the light guide plate 11 through using UV halftone printing technology.

Simultaneously refer to the photo path (namely the dotted line arrow in FIG. 1) of FIG. 1, under shined by the first light source 12, the light is entered from the side surface 113 of the thin second portion of the light guide plate 11, since the incident angle of the light is bigger than the light emitting surface 111, the direction of the light transmission is barely parallel with the light emitting surface 111, making the light fully reflected on the light emitting surface 111, not able to be entered; when the light is entered into the thicker first portion of the light guide plate 11, the light diverges, after reflection of the side surface and the bottom surface of the thick first portion of the light guide plate 11, the incident angle of the light and the light emitting surface 111 approximately decreases, the condition of full reflection is broken, thereby the light emits from the light emitting surface 111, lighting the display panel.

Suitably, under the condition of providing the light guide point 14 on the light guide plate 11, the plurality of light guide points 14 can make the light diverge to each direction more uniformly, making the emitting light more uniform.

Suitably, the light guide plate first portion can be outlets, hit point or V-cut structure.

Under the circumstance of the second light source 13 lighting, the light directly emits and lights the display panel through the thin second portion of the light guide plate 11.

The thicker first portion and the thin second portion of the light guide plate 11 respectively correspond to the first display region and the second display region during displaying. When the display of the first display region is only needed, lighting up the first light source 12, when the display of the second display region is only needed, lighting up the second light source 13, when the full display is needed, simultaneously lighting up the first light source 12 and the second light source 13.

Suitably, on the light emitting surface 111 of the light guide plate 11 can be also provided a diffusion plate in order to make the light uniformly emitted.

Distinguish to the prior art, the backlight module of the present embodiment comprises: a light guide plate, a first light source and a second light source; wherein the light guide plate comprises a light emitting surface and a bottom surface which are oppositely disposed as well as a side surface which is connected with the light emitting surface and the bottom surface; the light emitting surface and the bottom surface define thickness of the light guide plate, the light guide plate at least comprises a first portion which is relatively thicker and a second portion which is relatively thin; the first light source is provided opposite the side of the light guide plate, the second light source is provided opposite the bottom surface or the light emitting surface of the light guide plate second portion. Through the above way, the present disclosure combines the direct type and side-type backlight, making the display device achieved the split-screen display, at the same time, since there is not all direct type backlight which consumes higher power, it is able to reducing the power consumption of the display device.

Figure 2:
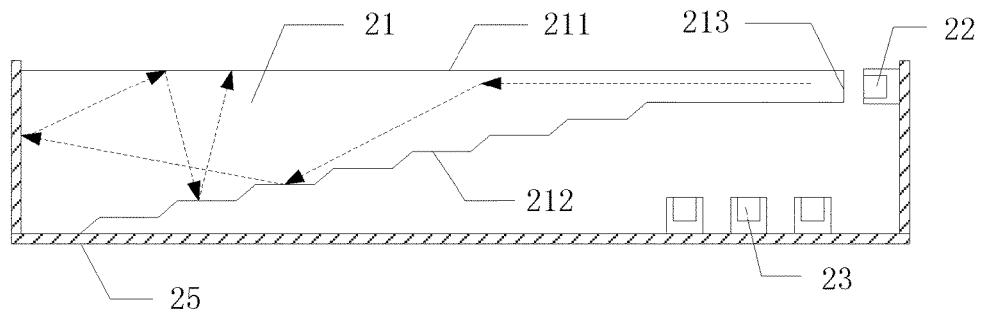
FIG. 2 is a structure side view diagram of a second embodiment of a backlight module of the present disclosure.
Figure 3:
FIG. 3 is a structure top view diagram of a first embodiment of a backlight module of the present disclosure.

Refer to FIG. 2 and FIG. 3, FIG. 2 is a structure side view diagram of a second embodiment of a backlight module of the present disclosure, FIG. 3 is a structure top view diagram of a first embodiment of a backlight module of the present disclosure, the backlight module comprises: a light guide plate 21, a first light source 22 and a second light source 23.

Wherein the light guide plate 21 comprises a light emitting surface 211 and a bottom surface 212 which are oppositely disposed as well as a side surface 213 which is connected with the light emitting surface 211 and the bottom surface 212; the light emitting surface 211 and the bottom surface 212 define thickness of the light guide plate 21, the light guide plate 21 at least comprises a first portion which is relatively thicker and a second portion which is relatively thin; the first light source 22 is provided opposite the side of the light guide plate 21, the second light source 23 is provided opposite the bottom surface 212 or the light emitting surface 211 of the light guide plate second portion.

Wherein the total thickness of the second light source 23 and the light guide plate 21 second portion is less than the thickness of the light guide plate 21 first portion.

Wherein the first portion of the light guide plate 21 is a wedge plate, the second portion of the light guide plate 21 is a flat plate with uniform thickness, one end of the light guide plate 21 second portion is connected with thin end of the light guide plate 21 first portion, the second light source 12 is provided near the bottom surface of the light guide plate 21 second portion, the first light source 22 is provided near the other end of said light guide plate 21 second portion.

Specifically, the bottom surface of the light guide plate 21 first portion is ladder, wherein each floor of the ladder is connected as ramp.

Suitably, on the bottom ladder of the first portion of the light guide plate 21 also can be provided outlets, a hit point or a V-cut structure.

Suitably, the first light source 22 and the second light source 23 are point light source, surface light source or line light source. For example, the first light source 22, the second light source 23 can be LED light source. It can be realized that the amount of the first light source 22 and the second light source 23 as shown in FIG. 2 and Figure is schematic diagram, the amount of the light source is not limited, the amount of the first light source 22 and the second light source 23 can be adjusted according to the size of the display panel or the intensity of the light source.

Wherein the lighting pattern of the first light source 22 and the second light source 23 at least comprise: the first light source 22 and the second light source 23 are lit at the same time, the first light source 22 is off and the second light source 23 is lit.

Specifically, simultaneously refer to the photo path (namely the dotted line arrow in FIG. 2) of FIG. 2, under shined by the first light source 22, the light is entered from the side surface 213 of the thin second portion of the light guide plate 21, since the incident angle of the light is bigger than the light emitting surface 211, the direction of the light transmission is barely parallel with the light emitting surface 211, making the light fully reflected on the light emitting surface 211, not able to be entered; when the light is entered into the thicker first portion of the light guide plate 21, the light diverges, after reflection of the side surface and the bottom surface of the thick first portion of the light guide plate 21, the incident angle of the light and the light emitting surface 211 approximately decreases, the condition of full reflection is broken, thereby the light emits from the light emitting surface 211, lighting the display panel.

Figure 4:
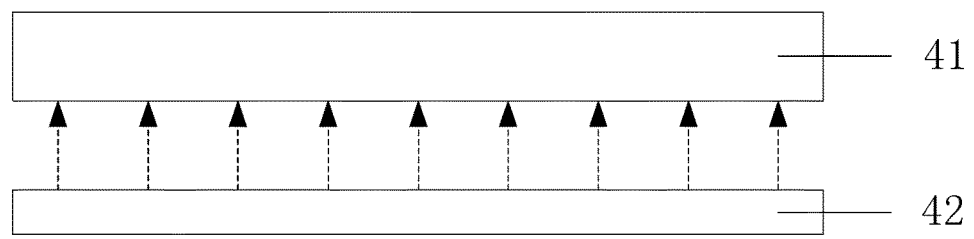
FIG. 4 is a structure diagram of an embodiment of a liquid crystal display of the present disclosure.

Refer to FIG. 4, FIG. 4 is a structure diagram of an embodiment of a liquid crystal display of the present disclosure, the liquid crystal display comprises: a display panel 41 which is provided in stacks and a backlight module 42.

Suitably, wherein the display panel 41 can comprise an array substrate, a color film substrate and a liquid crystal provided between the array substrate and the color film substrate, which can also comprise an upper and lower polarizers.

Wherein the backlight module 42 comprises: a light guide plate, a first light source and a second light source; wherein the light guide plate comprises a light emitting surface and a bottom surface which are oppositely disposed as well as a side surface which is connected with the light emitting surface and the bottom surface, the light emitting surface the light guide plate is provided near the display panel; the light emitting surface and the bottom surface define thickness of the light guide plate, the light guide plate at least comprises a first portion which is relatively thicker and a second portion which is relatively thin; the first light source is provided opposite the side of the light guide plate, the second light source is provided opposite the bottom surface or the light emitting surface of the light guide plate second portion.

Suitably, the lighting pattern of the first light source and the second light source at least comprise: the first light source and the second light source are lit at the same time, the first light source is off and the second light source is lit, when the second light source is lit, the display panel is only displayed on the corresponded region of the light guide plate second portion.

Suitably, the first portion of the light guide plate is a wedge plate, the second portion of the light guide plate is a flat plate with uniform thickness, one end of the light guide plate second portion is connected with thin end of the light guide plate first portion, the second light source is provided near the bottom surface of the light guide plate second portion, the first light source is provided near the other end of said light guide plate second portion.

Suitably, the bottom surface of the light guide plate first portion is ladder, outlets, hit point or V-cut structure.

Suitably, the total thickness of the second light source and the light guide plate second portion is less than the thickness of the light guide plate first portion, the first light source and the second light source are point light source, surface light source or line light source.

It can be realized that the liquid crystal display provided by the present disclosure is based on the other embodiment of the backlight module described above, wherein the structure of the backlight module and specific theory can refer to the embodiments described above and the relative drawings, there is no more description.

Figure 5:
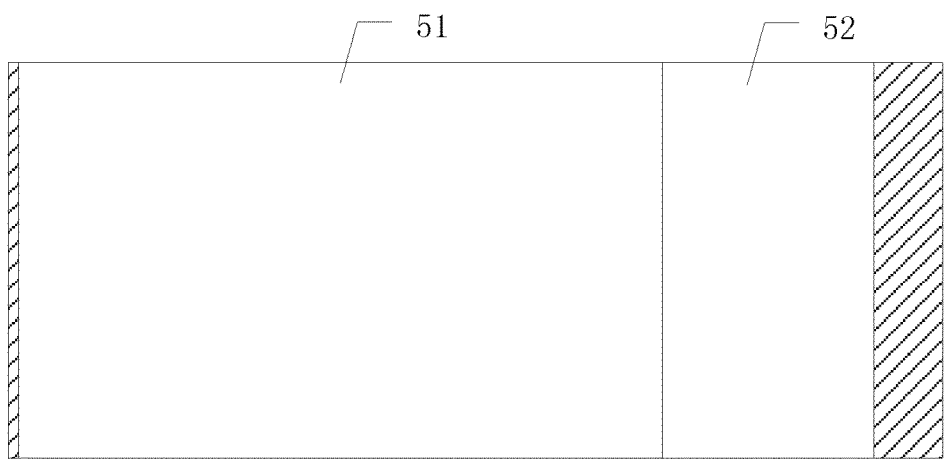
FIG. 5 is a schematic diagram of a display interface of an embodiment of a liquid crystal display of the present disclosure.

As shown in FIG. 5, FIG. 5 is a schematic diagram of a display interface of an embodiment of a liquid crystal display of the present disclosure, wherein the first display region 51 corresponds to the thicker region (or wedge region) of the light guide plate, the second display region 52 corresponds to the thin region of the light guide plate.

When the first light source lit, the first display region 51 displays the screen, when the second light source is lit, the second display region 52 displays the screen, when the first light source and the second light source are lit simultaneously, the first display region 51 and the second display region 52 simultaneously display the screen.

Distinguish to the prior art, the liquid crystal display of the present embodiment comprises: a display panel which is provided in stacks and a backlight module, the backlight module comprises: a light guide plate, a first light source and a second light source; wherein the light guide plate comprises a light emitting surface and a bottom surface which are oppositely disposed as well as a side surface which is connected with the light emitting surface and the bottom surface; the light emitting surface and the bottom surface defines thickness of the light guide plate, the light guide plate at least comprises a first portion which is relatively thicker and a second portion which is relatively thin; the first light source is provided opposite the side of the light guide plate, the second light source is provided opposite the bottom surface or the light emitting surface of the light guide plate second portion. Through the above way, the present disclosure combines the direct type and side-type backlight, making the display device achieved the split-screen display, at the same time, since there is not all direct type backlight which consumes higher power, it is able to reducing the power consumption of the display device.

The preferred embodiments according to the present disclosure are mentioned above, which cannot be used to define the scope of the right of the present disclosure. Those variations of equivalent structure or equivalent process according to the present specification and the drawings or directly or indirectly applied in other areas of technology are considered encompassed in the scope of protection defined by the claims of the present disclosure.

What is claimed is:

1. A backlight module, comprising: a light guide plate, a first light source and a second light source; wherein said light guide plate comprises a light emitting surface, a bottom surface opposite to the light emitting surface, and a side surface connected with said light emitting surface and said bottom surface; and the bottom surface comprises a first bottom surface and a second bottom surface connected to the first bottom surface; said light emitting surface and said bottom surface defining thickness of said light guide plate, said light guide plate at least comprising a first portion and a second portion, wherein the first portion is thicker than the second portion, the first portion comprises the first bottom surface, and the second portion comprises the second bottom surface; said first portion of said light guide plate being a wedge plate, said second portion of said light guide plate being a flat plate with uniform thickness, wherein the second portion comprises a first end and a second end opposite to the first end, the first end is connected with a thin end of said first portion, said second light source being provided near the second bottom surface, and said first light source is close to the second end of the second portion and away from the first portion; wherein said first light source and said second light source are configured to be lit at the same time, or said first light source is configured to be off and the said second light source is configured to be lit.

2. The backlight module as claimed in claim 1, wherein said first bottom surface is stepped or triangular.

3. The backlight module as claimed in claim 2, wherein a total thickness of said second light source and said light guide plate second portion is less than a thickness of said light guide plate first portion, said first light source and said second light source are point light sources, surface light sources or line light sources.

4. The backlight module as claimed in claim 1, wherein a total thickness of said second light source and said light guide plate second portion is less than a thickness of said light guide plate first portion, said first light source and said second light source are point light sources, surface light sources or line light sources.

5. The backlight module as claimed in claim 1, wherein the backlight module consists of the light guide plate, the first light source and the second light source, the light guide plate consists of the first portion and the second portion, and the first light source is close to the second portion and away from the first portion.

6. A backlight module, comprising: a light guide plate, a first light source and a second light source; wherein said light guide plate comprises a light emitting surface and a bottom surface which are oppositely disposed as well as a side surface which is connected with said light emitting surface and said bottom surface, and the bottom surface comprises a first bottom surface and a second bottom surface connected to the first bottom surface; said light emitting surface and said bottom surface defining thickness of said light guide plate, said light guide plate at least comprising a first portion and a second portion, wherein the first portion is thicker than the second portion, the first portion comprises the first bottom surface, and the second portion comprises the second bottom surface; said first light source being close to the second portion and away from the first portion, said second light source being provided opposite said bottom surface or said light emitting surface.

7. The backlight module as claimed in claim 6, wherein said first light source and said second light source are configured to be lit at the same time, or said first light source is off and said second light source is lit.

8. The backlight module as claimed in claim 6, wherein said first portion of said light guide plate is a wedge plate, said second portion of said light guide plate is a flat plate with uniform thickness and comprises a first end and a second end opposite to the first end, the first end of said light guide plate second portion being connected with a thin end of said first portion, said second light source being provided near the second bottom surface, said first light source being provided near the second end.

9. The backlight module as claimed in claim 8, wherein said the first bottom surface is stepped or triangular.

10. The backlight module as claimed in claim 6, wherein a total thickness of said second light source and said light guide plate second portion is less than a thickness of said light guide plate first portion, said first light source and said second light source are point light sources, surface light sources or line light sources.

11. The backlight module as claimed in claim 6, wherein the backlight module consists of the light guide plate, the first light source and the second light source, the light guide plate consists of the first portion and the second portion, and the first light source is close to the second portion and away from the first portion.

12. A liquid crystal display, comprising: a display panel and a backlight module stacked with each other, said backlight module comprising: a light guide plate, a first light source and a second light source; wherein said light guide plate comprises a light emitting surface and a bottom surface which are oppositely disposed as well as a side surface which is connected with said light emitting surface and said bottom surface; said light emitting surface and said bottom surface defining a thickness of said light guide plate, said light guide plate at least comprising a first portion and a second portion, wherein the first portion is thicker than the second portion; said first light source being close to the second portion and away from the first portion, said second light source being provided opposite said bottom surface or said light emitting surface.

13. The backlight module as claimed in claim 12, wherein said first light source and said second light source are configured to be lit at the same time, or said first light source being off and said second light source being lit, wherein when said second light source is lit, said display panel only displays in a region corresponding to said second portion.

14. The backlight module as claimed in claim 12, wherein said first portion of said light guide plate is a wedge plate, said second portion of said light guide plate is a flat plate with uniform thickness and having a first end and a second end opposite to the first end, the first end of said second portion being connected with a thin end of said light guide plate first portion, said second light source being provided near said bottom surface of said second portion, said first light source being close to the second end and away from the first portion.

15. The backlight module as claimed in claim 14, wherein the first portion comprises a first bottom surface, and the first bottom surface is stepped or triangular.

16. The backlight module as claimed in claim 12, wherein a total thickness of said second light source and said second portion is less than a thickness of said first portion, said first light source and said second light source are point light sources, surface light sources or line light sources.

17. The backlight module as claimed in claim 12, wherein the backlight module consists of the light guide plate, the first light source and the second light source, the light guide plate consists of the first portion and the second portion, and the first light source is close to the second portion and away from the first portion.

* * * * *